United States Patent
Sim

(10) Patent No.: US 11,427,721 B2
(45) Date of Patent: Aug. 30, 2022

(54) PHOTOCURABLE COMPOSITION FOR 3D PRINTER FOR PRODUCING TRANSPARENT ORTHODONTIC DEVICE

(71) Applicant: GRAPHY INC., Seoul (KR)

(72) Inventor: Un Seob Sim, Seoul (KR)

(73) Assignee: GRAPHY INC., Seoul (KR)

( * ) Notice: Subject to any disclaimer, the term of this patent is extended or adjusted under 35 U.S.C. 154(b) by 0 days.

(21) Appl. No.: 17/259,026

(22) PCT Filed: Jul. 5, 2019

(86) PCT No.: PCT/KR2019/008255
§ 371 (c)(1),
(2) Date: Jan. 8, 2021

(87) PCT Pub. No.: WO2020/080643
PCT Pub. Date: Apr. 23, 2020

(65) Prior Publication Data
US 2021/0292580 A1   Sep. 23, 2021

(30) Foreign Application Priority Data

Oct. 16, 2018  (KR) .................. 10-2018-0123132

(51) Int. Cl.
| | |
|---|---|
| *C09D 11/10* | (2014.01) |
| *C09D 11/102* | (2014.01) |
| *B33Y 70/00* | (2020.01) |
| *B33Y 80/00* | (2015.01) |
| *A61C 7/08* | (2006.01) |
| *C09D 11/101* | (2014.01) |

(52) U.S. Cl.
CPC .............. *C09D 11/102* (2013.01); *A61C 7/08* (2013.01); *B33Y 70/00* (2014.12); *B33Y 80/00* (2014.12); *C09D 11/101* (2013.01); *A61C 2201/00* (2013.01)

(58) Field of Classification Search
CPC .. C09D 135/02; C09D 11/101; C09D 11/107; C09D 11/03; B41M 7/0081; B41M 5/0023; B41J 11/002
See application file for complete search history.

(56) References Cited

U.S. PATENT DOCUMENTS

| | | |
|---|---|---|
| 5,975,893 A | 11/1999 | Chishti et al. |
| 6,217,325 B1 | 4/2001 | Chishti et al. |
| 2017/0342024 A1 | 11/2017 | Monnier et al. |
| 2017/0360534 A1 | 12/2017 | Sun et al. |

FOREIGN PATENT DOCUMENTS

| | | |
|---|---|---|
| CN | 104334662 A | 2/2015 |
| CN | 107868443 A | 4/2018 |
| CN | 108276948 A | 7/2018 |
| JP | 2010132780 A | 6/2010 |
| KR | 20110091742 A | 8/2011 |
| KR | 101822151 B1 | 1/2018 |
| KR | 101855122 B1 | 6/2018 |

OTHER PUBLICATIONS

Buruiana et al. Photopolymerization experiments and properties of some urethane/urea methacrylates tested in dental composites. Journal of Composite Materials. 2012;46(4):371-382. (Year: 2012).*
International Search Report of PCT/KR2019/008255, dated Oct. 25, 2019, English translation.
The extended European search report of EP 19 87 4336, dated Feb. 17, 2022.

* cited by examiner

*Primary Examiner* — Sanza L. McClendon
(74) *Attorney, Agent, or Firm* — STIP Law Group, LLC

(57) ABSTRACT

The present invention pertains to a photocurable composition for a 3D printer for producing a transparent orthodontic device. A photocurable composition for a 3D printer can be provided, which has excellent physical properties such as thermal properties, strength, elastic modulus, and tensile elongation, and when used in a patient-customized transparent orthodontic device, the orthodontic device can reduce the pain felt by patients and can enhance orthodontic correction effectiveness due to being closely fitted to the dental structure. Moreover, a 3D-printed transparent orthodontic device can be produced which can be restored to the original shape thereof even when deformed from use.

8 Claims, 4 Drawing Sheets

PHOTOCURABLE COMPOSITION FOR 3D PRINTER FOR PRODUCING TRANSPARENT ORTHODONTIC DEVICE

CROSS-REFERENCE TO RELATED APPLICATIONS

This application is the U.S. National Phase under 35 U.S.C. § 371 of International Application No. PCT/KR2019/008255 filed on Jul. 5, 2019, which in turn claims the benefit of Korean Application No. 10-2018-0123132, filed on Oct. 16, 2018, the disclosures of which are incorporated by reference into the present application.

TECHNICAL FIELD

The present disclosure relates to a photocurable composition for 3D printing for producing a transparent orthodontic device, and more particularly, to a photocurable composition for 3D printing capable of producing a transparent orthodontic device that is not visually recognized well from the outside because the orthodontic device is made of a transparent material, and may be easily restored to the original shape thereof and reused even if the state of the orthodontic device changes by use because the orthodontic device is restored to the original shape thereof by heat.

BACKGROUND ART

In general, uneven dentition, malocclusion, and facial protrusion are caused by the inability of teeth and oral and maxillofacial areas to grow in place due to dysplasia of teeth or jawbone, bad habits affecting teeth, or inheritance, etc. Since the dentition and oral structures act as a factor that determines a person's impression and cause the deterioration in the grinding function of food, there is an interesting interest in orthodontics.

Orthodontic treatment uses the property that the teeth move when receiving a certain force. The most widely used method for orthodontics is a fixed treatment method of attaching a bracket to the teeth and moving the teeth using elasticity of an orthodontic wire and a rubber band, etc. The bracket is generally made of metal, which is conspicuous during treatment period.

In order to overcome such a disadvantage, a transparent orthodontic method was proposed. Transparent orthodontic method is a procedure for correction of the dentition by producing a transparent orthodontic device that changes step by step from the teeth state before orthodontics to the teeth state desired to be corrected and inserting the transparent orthodontic device into the teeth.

In detail, the procedure with the transparent orthodontic device was performed using an orthodontic device developed by "Align Technology, Inc." of the United States under the name of "Invisalign System" in 1997, which is disclosed in U.S. Pat. Nos. 5,975,893 and 6,217,325, etc.

In the "Invisalign System", three-dimensional scan data of the teeth is cut one by one on a computer using a special program, 20 to 30 pairs of models are made step by step to the position where the teeth should finally move through virtual simulation, and then a transparent plastic frame capable of moving teeth is produced for each model and distributed to a patient.

The "Invisalign System" is characterized in that the teeth to be corrected may be gradually moved to the final target point by inserting the prepared series of plastic frame-type orthodontic devices into the teeth step by step, the plastic frame is made of a transparent material and is not visually recognized well from the outside, which can greatly help the daily social life of an orthodontic patient, and the patient may also attach and detach the orthodontic device if necessary.

However, although the transparent orthodontic device has the above-described advantages compared to the fixed orthodontic device using the bracket described above, the pain felt by the patient is considerable.

That is, since such a transparent orthodontic treatment induces the teeth alignment by using a hard sheet due to the nature of a material to ensure esthetics, the transparent orthodontic device is hard due to the nature of a hard material, so that the pain felt by the patient is considerable.

In addition, the transparent orthodontic device has many advantages, but is poorer than the fixed orthodontic device in that if the transparent orthodontic device does not fit well with the dental structure during tooth movement, the transparent orthodontic device fails to be closely fitted to the dental structure and the desirable tooth movement is difficult. Particularly, when the teeth are corrected using the transparent orthodontic device, the teeth are inclined unintentionally.

If the teeth continue to be inclined, the teeth gradually lie down, or in severe cases, the teeth collide with the roots of adjacent teeth and cause root resorption, the first produced transparent orthodontic device does not fit with the dental structure and eventually leads to the troublesome and cost of reproducing the transparent orthodontic device and the increase in the period of orthodontic treatment.

Meanwhile, when the teeth are rotated, extruded or intrude, and a tooth axis is directly erected by using a conventional transparent orthodontic device, an additional attachment that may improve each orthodontic effectiveness for the transparent orthodontic device is attached to the tooth surface and used.

In this case, the attachment is messy in appearance, and if the teeth are corrected with two orthodontic actions, for example, rotation and intrusion, or rotation and extrusion, several attachments to be attached to one tooth. In such a state where a plurality of attachments are attached to the teeth, it is more difficult to attach and detach the transparent orthodontic device. In addition, when the transparent orthodontic device is detached from the teeth, the transparent orthodontic device is easily deformed, and the attachments are easily detached.

There is an advantage in that the transparent orthodontic device is not visually recognized well from the outside, which can greatly help the daily social life of the orthodontic patient, and the patient may also attach or detach the orthodontic device if necessary. However, the problems arise in that as mentioned above, since the transparent orthodontic device is hard due to the nature of the hard material, the pain felt by the patient is large, the orthodontic device fails to be closely fitted to the dental structure and desirable tooth movement is difficult, and when the transparent orthodontic device does not fit well with the dental structure, the transparent orthodontic device needs to be reproduced.

To solve these problems, it is necessary to develop a material for producing a transparent orthodontic device.

PRIOR ART DOCUMENTS

Patent Documents (Patent Document 1) KR 10-1822151 B1

DISCLOSURE

Technical Problem

An object of the present disclosure is to provide a photocurable composition for 3D printing for producing a transparent orthodontic device.

Another object of the present disclosure is to provide a photocurable composition for 3D printing, which has excellent physical properties such as thermal properties, strength, elastic modulus, and tensile elongation, and when used in a patient-customized transparent orthodontic device, the transparent orthodontic device may reduce the pain felt by a patient and may enhance orthodontic effectiveness due to being closely fitted to the dental structure.

Still another object of the present disclosure is provide a photocurable polymer composition for 3D printing capable of producing a transparent orthodontic device whose shape may be restored, even if the original shape thereof is deformed by use.

Technical Solution

To achieve the above objects, a photocurable composition for 3D printing for producing a transparent orthodontic device according to an embodiment of the present disclosure comprises: a UV-curable polyurethane oligomer represented by the following Formula 1; a photoinitiator; a silane coupling agent; an oligomer; and a stabilizer:

carbon atoms, a substituted or unsubstituted alkynyl group having 2 to 24 carbon atoms, a substituted or unsubstituted aralkyl group having 7 to 30 carbon atoms, a substituted or unsubstituted aryl group having 6 to 30 carbon atoms, a substituted or unsubstituted heteroaryl group having 5 to 60 carbon atoms, a substituted or unsubstituted heteroarylalkyl group having 6 to 30 carbon atoms, a substituted or unsubstituted alkoxy group having 1 to 30 carbon atoms, a substituted or unsubstituted alkylamino group having 1 to 30 carbon atoms, a substituted or unsubstituted arylamino group having 6 to 30 carbon atoms, a substituted or unsubstituted aralkylamino group having 6 to 30 carbon atoms, a substituted or unsubstituted heteroarylamino group having 2 to 24 carbon atoms, a substituted or unsubstituted alkylsilyl group having 1 to 30 carbon atoms, a substituted or unsubstituted arylsilyl group having 6 to 30 carbon atoms, and a substituted or unsubstituted aryloxy group having 6 to 30 carbon atoms, and the substituted alkylene group, the substituted arylene group, the substituted heteroarylene group, the substituted cycloalkylene group, the substituted alkyl group, the substituted cycloalkyl group, the substituted alkenyl group, the substituted alkynyl group, the substituted aralkyl group, the substituted aryl group, the substituted heteroaryl group, the substituted heteroarylalkyl group, the substituted alkoxy group, the substituted alkylamino group, the substituted arylamino group, the substituted aralkylamino group, the substituted heteroarylamino group, the substituted alkylsilyl group, the substituted arylsilyl group, and the substituted aryloxy group are substituted with one or more substituents selected from the group consisting of hydrogen, deuterium, a cyano group, a nitro group, a halogen group, a hydroxy group, an alkyl group having 1 to 30 carbon atoms, a cycloalkyl group having 1 to 20 carbon atoms, an alkenyl

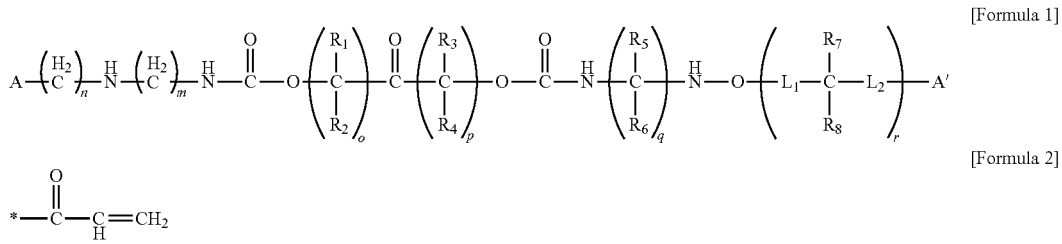

[Formula 1]

[Formula 2]

wherein

A and A' are each a substituent represented by Formula 2 above, n, m, o, p, q, and r are the same as or different from each other, and are each independently an integer of 1 to 100, $L_1$ and $L_2$ are the same as or different from each other, and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, and a substituted or unsubstituted cycloalkylene group having 3 to 200 carbon atoms, $R_1$ to $R_8$ are the same as or different from each other, and are each independently selected from the group consisting of hydrogen, deuterium, a cyano group, a nitro group, a halogen group, a hydroxy group, a substituted or unsubstituted alkyl group having 1 to 30 carbon atoms, a substituted or unsubstituted cycloalkyl group having 1 to 20 carbon atoms, a substituted or unsubstituted alkenyl group having 2 to 30 group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and if they are substituted with a plurality of substituents, these substituents are the same as or different from each other.

The transparent orthodontic device using the photocurable composition for 3D printing has an elastic modulus of 1,500 to 2,000 N/m², a tensile strength of 40 to 50 N/m², and a Flexural strength of 45 to 55 N/m².

The transparent orthodontic device using the photocurable composition for 3D printing is capable of being restored to the original shape thereof in the range of 40 to 80° C.

The UV-curable polyurethane oligomer has a weight average molecular weight of 10,000 to 1,000,000.

The photoinitiator is a compound represented by the following Formula 3:

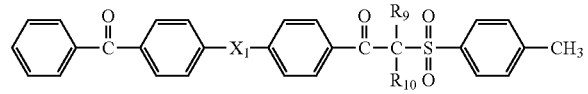

[Formula 3]

wherein $X_1$ is S, O, or $N(R_{11})$, $R_9$ to $R_{11}$ are the same as or different from each other, and are each independently hydrogen, deuterium, a cyano group, a nitro group, a halogen group, a hydroxy group, a substituted or unsubstituted alkyl group having 1 to 30 carbon atoms, and a substituted or unsubstituted cycloalkyl group having 3 to 30 carbon atoms, and the substituted alkyl group and the substituted cycloalkyl group are substituted with one or more substituents selected from the group consisting of hydrogen, deuterium, a cyano group, a nitro group, a halogen group, a hydroxy group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and if they are substituted with a plurality of substituents, these substituents are the same as or different from each other.

The oligomer may be selected from the group consisting of an epoxy acrylate oligomer, $H_{12}$ dian-bis-glycidyl ether (4,4'-(1-methylethylidene)biscyclohexanol, polymer with (chloromethyl)oxirane), and a mixture thereof.

The stabilizer may be selected from the group consisting of 2,6-di-tert-butyl-p-cresol, diethylethanolamine, trihexylamine, hindered amine, organic phosphate, hindered phenol, and a mixture thereof.

A transparent orthodontic device according to another embodiment of the present disclosure may include the photocurable composition for 3D printing.

Hereinafter, the present disclosure will be described in more detail.

3D printing in the present disclosure refers to a process for producing a three-dimensional object by stacking a material using 3D digital data. In the present specification, description is made focusing on digital light processing (DLP), stereolithography apparatus (SLA) and PolyJet as 3D printing technologies, but it may be understood that the present disclosure may also be applied to other 3D printing technologies.

The photocurable composition according to the present disclosure is a material that is cured by light irradiation, and refers to a polymer that is crosslinked and polymerized into a polymer network. In the present specification, description is made focusing on UV light, but the present disclosure is not limited to UV light and may be applied to other lights as well.

The photocurable composition for 3D printing for producing a transparent orthodontic device according to an embodiment of the present disclosure may comprise: a UV-curable polyurethane oligomer represented by the following Formula 1; a photoinitiator; a silane coupling agent; an oligomer; and a stabilizer:

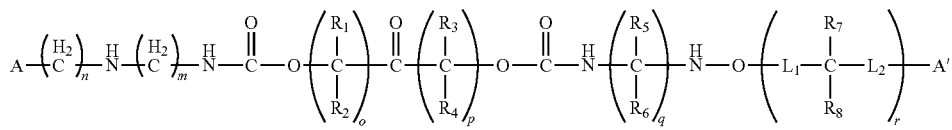

[Formula 1]

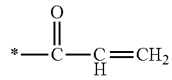

[Formula 2]

wherein

A and A' are each a substituent represented by Formula 2 above, n, m, o, p, q, and r are the same as or different from each other, and are each independently an integer of 1 to 100, $L_1$ and $L_2$ are the same as or different from each other, and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, and a substituted or unsubstituted cycloalkylene group having 3 to 200 carbon atoms, $R_1$ to $R_8$ are the same as or different from each other, and are each independently selected from the group consisting of hydrogen, deuterium, a cyano group, a nitro group, a halogen group, a hydroxy group, a substituted or unsubstituted alkyl group having 1 to 30 carbon atoms, a substituted or unsubstituted cycloalkyl group having 1 to 20 carbon atoms, a substituted or unsubstituted alkenyl group having 2 to 30 carbon atoms, a substituted or unsubstituted alkynyl group having 2 to 24 carbon atoms, a substituted or unsubstituted aralkyl group having 7 to 30 carbon atoms, a substituted or unsubstituted aryl group having 6 to 30 carbon atoms, a substituted or unsubstituted heteroaryl group having 5 to 60 carbon atoms, a substituted or unsubstituted heteroarylalkyl group having 6 to 30 carbon atoms, a substituted or unsubstituted alkoxy group having 1 to 30 carbon atoms, a substituted or unsubstituted alkylamino group having 1 to 30 carbon atoms, a substituted or unsubstituted arylamino group having 6 to 30 carbon atoms, a substituted or unsubstituted aralkylamino group having 6 to 30 carbon atoms, a substituted or unsubstituted heteroarylamino group having 2 to 24 carbon atoms, a substituted or unsubstituted alkylsilyl group having 1 to 30 carbon atoms, a substituted or unsubstituted arylsilyl group having 6 to 30 carbon atoms, and a substituted or unsubstituted aryloxy group having 6 to 30 carbon atoms, and the substituted alkylene group, the substituted arylene group, the substituted heteroarylene group, the substituted cycloalkylene group, the substituted alkyl group, the substituted cycloalkyl group, the substituted alkenyl group, the substituted alkynyl group, the substituted aralkyl group, the substituted aryl group, the substituted heteroaryl group, the substituted heteroarylalkyl group, the substituted alkoxy group, the substituted alkylamino group, the substituted arylamino group, the substituted aralkylamino group, the substituted heteroarylamino group, the substituted alkylsilyl group, the substituted arylsilyl group, and the substituted aryloxy group are substituted with one or more substituents selected from the group consisting of hydrogen, deuterium, a cyano group, a nitro group, a halogen group, a hydroxy group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and if they are substituted with a plurality of substituents, these substituents are the same as or different from each other.

The UV-curable polyurethane oligomer is a polymer having a weight average molecular weight of 10,000 to 1,000,000.

More preferably, the UV-curable polyurethane oligomer is a compound represented by the following Formula 4:

and the photocurable functional group is the substituent represented by Formula 2 above.

The substituent represented by Formula 2 above includes a carbon-carbon double bond therein, and may exhibit photocuring activity by the carbon-carbon double bond.

In addition, the UV-curable polyurethane oligomer includes a polyurethane structure as a main chain, and photocurable functional group is linked to the polyurethane structure. Linkage between the polyurethane structure and the photocurable functional group is achieved using a linker including a soft functional group attached to a urethane linker and a linker including a hard functional group attached to a urethane linker.

The linker including the soft functional group attached to the urethane linker may use the flexible property of the soft functional group together, and the hard functional group may exhibit heat resistance.

That is, as the photocurable functional group is linked to the UV-curable polyurethane oligomer and the linker includes the soft functional group and the hard functional group, the UV-curable polyurethane oligomer may exhibit a flexible effect using a carbon skeleton having soft properties at room temperature, as well as a strong heat resistance using a carbon skeleton having hard properties at room temperature.

As the UV-curable polyurethane oligomer includes the carbon skeleton having hard properties, it is possible to produce a 3D printed product having excellent physical properties such as thermal properties, strength, elastic modulus, and tensile elongation.

Further, as the UV-curable polyurethane oligomer includes the carbon skeleton having soft properties, it is possible to produce a 3D printed product which, even if the original shape thereof is deformed by use, may be restored to the original shape thereof.

In general, a composition for 3D printing may include only a carbon skeleton having hard properties to improve the physical properties of a 3D printed product. However, in this case, a problem arises in that, when the shape of the 3D printed product is deformed by use, the 3D printed product cannot be restored to the original shape thereof, and thus cannot be used multiple times.

As the composition for 3D printing according to the present disclosure includes a carbon skeleton having hard

[Formula 4]

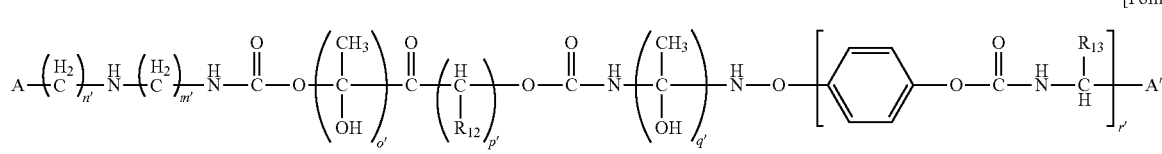

wherein

A and A' are each as defined in Formula 1, n', m', o', p', q', and r' are the same as or different from each other, and are each independently an integer of 1 to 100, $R_{12}$ and $R_{13}$ are the same as or different from each other, and are each independently selected from the group consisting of an alkylsilyl group having 1 to 30 carbon atoms, an arylsilyl group having 6 to 30 carbon atoms, an alkoxy group having 1 to 30 carbon atoms, and a cycloalkyl group having 1 to 20 carbon atoms.

More specifically, the UV-curable polyurethane oligomer is a polymer compound in which a photocurable functional group is linked to a polyurethane oligomer for UV curing, properties and a carbon skeleton having soft properties in the UV-curable polyurethane oligomer, the 3D printed product produced from the composition may exhibit excellent physical properties such as thermal properties, strength, elastic modulus, and tensile elongation, and may also use the flexible property of the soft functional group, and thus when the shape thereof is deformed by use, the printed product may be restored to the original shape thereof and reused.

In the case of a conventional transparent orthodontic device, the fine movement of the teeth or deformation caused by the use of the orthodontic device may cause a problem in that the orthodontic device does not fit well with the dental structure over time, even though the orthodontic device fits well with the dental structure.

In this case, the conventional transparent orthodontic device needs to be reproduced, which inevitably results in a great loss in terms of time and economy. On the other hand, even if the shape of the transparent orthodontic device according to the present disclosure is deformed by use, the deformed transparent orthodontic device is capable of being restored to the original shape thereof when heated in the range of 40 to 80° C.

More specifically, in the case of the present disclosure, when the transparent orthodontic device whose shape has been deformed by use is put in water at 40 to 80° C. and 5 to 10 seconds have elapsed, the deformed transparent orthodontic device is capable of being restored to the original shape thereof.

Even if hot water from a water purifier, which is generally easily available, is used, the deformed transparent orthodontic device is capable of being restored to the original state thereof.

Further, there is a problem in that when the composition for 3D printing includes only a carbon skeleton having soft properties, the printed product has low physical properties, and thus does not exhibit thermal properties, strength, elastic modulus, and tensile elongation that may be used as the printed product.

In particular, for use as the transparent orthodontic device, the 3D printed product needs to have high physical properties, which can be effective as the orthodontic device. The conventional transparent orthodontic device does not have high physical properties, resulting in a lack of orthodontic effectiveness as the orthodontic device. However, in the case of using the composition for 3D printing according to the present disclosure, the transparent orthodontic device has excellent physical properties such as a tensile modulus of 1,500 to 2,500 MPa, a flexural modulus of 1,000 to 3,500 MPa, and a tensile strength of 45 to 90 MPa, and may thus exhibit excellent orthodontic effectiveness as the orthodontic device.

The conventional transparent orthodontic device is simply made of a transparent material, which has an advantage in terms of the user's aesthetics. However, there are problems in that as mentioned above, since the transparent orthodontic device is hard due to the nature of the hard material, the pain felt by the patient is large, the device fails to be closely fitted to the dental structure and desirable tooth movement is difficult, and when the transparent orthodontic device does not fit well with the dental structure, the transparent orthodontic device needs to be reproduced.

On the other hand, in the case of printing a transparent orthodontic device using the photocurable composition for 3D printing for producing the transparent orthodontic device according to the present disclosure, the transparent orthodontic device is made of transparent material, reduces pain felt by the patient due to the tough material property, as compared to the conventional transparent orthodontic device, is easily fitted to the dental structure, and enables desirable tooth movement due to excellent physical properties thereof. Also, even if the transparent orthodontic device is deformed, the transparent orthodontic device may be restored to the original shape thereof by heating in the range of 40 to 80° C. without the need for separate production.

The photoinitiator is a compound represented by the following Formula 3:

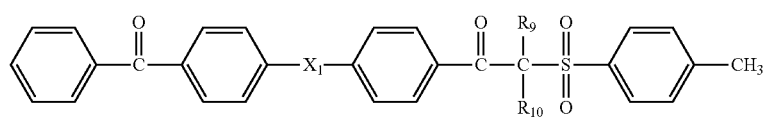

[Formula 3]

wherein $X_1$ is S, O, or $N(R_{11})$, $R_9$ to $R_{11}$ are the same as or different from each other, and are each independently hydrogen, deuterium, a cyano group, a nitro group, a halogen group, a hydroxy group, a substituted or unsubstituted alkyl group having 1 to 30 carbon atoms, and a substituted or unsubstituted cycloalkyl group having 3 to 30 carbon atoms, and the substituted alkyl group and the substituted cycloalkyl group are substituted with one or more substituents selected from the group consisting of hydrogen, deuterium, a cyano group, a nitro group, a halogen group, a hydroxy group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and if they are substituted with a plurality of substituents, these substituents are the same as or different from each other.

More preferably, the photoinitiator is a compound represented by the following Formula 5:

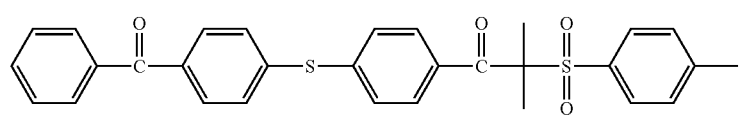

[Formula 5]

The oligomer may be selected from the group consisting of an epoxy acrylate oligomer, $H_{12}$ dian-bi s-glycidyl ether (4,4'-(1-methylethylidene)biscyclohexanol, polymer with (chloromethyl)oxirane), and a mixture thereof.

More specifically, the epoxy acrylate oligomer may use one or more compounds selected from the group consisting of phenyl epoxy (meth)acrylate oligomer, bisphenol A epoxy di(meth)acrylate oligomer, aliphatic alkyl epoxy di(meth)acrylate oligomer, and aliphatic alkyl epoxy tri(meth)acrylate oligomer. The oligomer may not only reduce swelling caused by an organic solvent, but also improve surface hardness, abrasion resistance, heat resistance, etc.

More specifically, the silane coupling agent is 3-methacryloxypropyltrimethoxysilane, but is not limited thereto.

The stabilizer is selected from the group consisting of 2,6-di-tert-butyl-p-cresol, diethylethanolamine, trihexylamine, hindered amine, organic phosphate, hindered phenol, and a mixture thereof, and more specifically, 2,6-di-tert-butyl-p-cresol.

To improve thermal and oxidation stability, storage stability, surface properties, flow properties, and process properties, conventional additives may be included, such as a leveling agent, a slip agent, or a stabilizer.

The photocurable composition for 3D printing for producing the transparent orthodontic device may comprise the UV-curable polyurethane oligomer; and comprise: 1.5 to 15 parts by weight of the photoinitiator; 0.1 to 1.5 parts by weight of the silane coupling agent; 15 to 45 parts by weight of the oligomer; and 0.1 to 2 parts by weight of the stabilizer, based on 100 parts by weight of the UV-curable polyurethane oligomer. The silane coupling agent, if used within the range of use, may improve the compatibility with and adhesion strength to a resin when used in the surface treatment using a pigment and a filler. If the oligomer is used in an amount exceeding the upper limit of the range described above, it may reduce a mold release property of the resin by increasing surface energy and degrade the surface properties of the mold, such as post-stamping restoration force, by increasing surface hardness. When the stabilizer is used in an amount within the range described above, it is possible to decrease ambient cure and increase strength.

The production of the transparent orthodontic device of the present disclosure includes: a 3D input step of inputting 3D information on the dental structure; a 3D model generation step of generating a plurality of 3D models divided into a plurality of regions by setting a range of interest using the 3D information and setting the central axis of the dental structure as the x-axis; and a 3D printing step of printing the plurality of 3D models by a digital light processing (DLP) method.

A 3D printing unit prints the plurality of 3D models by the digital light processing (DLP) method. The 3D printing unit may generate an entire orthodontic device in a short time by printing the 3D models at the same time or different times. The 3D printing unit may print a transparent orthodontic device using the photocurable composition for 3D printing according to the present disclosure by to the user's setting.

The transparent orthodontic device is produced by printing out a 3D model by the DLP method, and thus, the thickness of a specific region may be adjusted to increase the orthodontic effect.

The transparent orthodontic device may generate a 3D model so as to include an attachment in a portion corresponding to the inside the teeth and printing out the 3D model by a stereolighography apparatus (SLA) or a digital light processing (DLP) method.

More specifically, the 3D model may generate a hole for indirect bonding, and may also be printed out and used as a wire and indirect bonding parallel device.

In addition, the 3D printing unit may have a surface treatment on boundaries between a plurality of 3D printed products corresponding to the plurality of 3D models so as to strengthen the bonding between the plurality of 3D printed product. For example, a UV treatment or heat treatment may be performed on the respective boundary of the 3D printed products, but the surface treatment is not limited thereto. This is to facilitate bonding between the neighboring 3D printed products by roughening the boundaries between the 3D printed products. A plurality of divided 3D printed products may be bonded through a heat treatment, etc. after a resin is applied to the boundaries thereof.

Advantageous Effects

The present disclosure provides a photocurable composition for 3D printing, which has excellent physical properties such as thermal properties, strength, elastic modulus, and tensile elongation, and when used in a patient-customized transparent orthodontic device, the transparent orthodontic device may reduce the pain felt by a patient and may enhance orthodontic effectiveness due to being closely fitted to the dental structure.

Moreover, it is possible to produce a 3D-printed transparent orthodontic device capable of being restored to the original shape thereof, even if the original shape thereof is deformed by use.

BEST MODE

The present disclosure relates to a photocurable composition for 3D printing for producing a transparent orthodontic device, the composition comprising a UV-curable polyurethane oligomer; a photoinitiator; a silane coupling agent; an oligomer; and a stabilizer.

MODE FOR INVENTION

Hereinafter, embodiments of the present disclosure will be described in detail so as to be easily carried out by those of ordinary skill in the art to which the present disclosure pertains. However, the present disclosure may be implemented in various different forms and is not limited to examples described herein.

Preparation Example: Preparation of Photocurable Polymer Composition for 3D Printing A photocurable polymer composition for 3D printing was prepared by mixing a UV-curable polyurethane oligomer represented by the following Formula 6 or Formula 7; a photoinitiator represented by the following Formula 5; 3-methacryloxypropyltrimethoxysilane; an epoxy acrylate oligomer; and 2,6-di-tert-butyl-p-cresol. The oligomer, etc. used in the preparation of the polymer composition, were purchased, and the contents of the components are shown in Table 1 below.

TABLE 1

|  | S10 | S20 | S30 | S40 | S50 | S60 | S70 | S80 |
|---|---|---|---|---|---|---|---|---|
| Formula 6 | 100 | 100 | 100 | 100 | 100 | 100 | — | — |
| Formula 7 | — | — | — | — | — | — | 100 | 100 |
| Photo-initiator | 1 | 1.5 | 5 | 10 | 15 | 20 | 10 | 15 |
| Silance coupling agent | 0.05 | 0.1 | 0.5 | 1 | 1.5 | 2 | 1 | 1.5 |
| Oligomer | 10 | 15 | 25 | 30 | 45 | 50 | 30 | 45 |
| Stabilizer | 0.05 | 0.1 | 0.5 | 1 | 2 | 3 | 1 | 2 |

(unit: parts by weight)

Experimental Example: Experiment for Evaluation of Physical Properties

1. Test conditions
1-1. Tensile Test
Test method: ASTM D638
Testing instrument: Universal Testing Machine

[Formula 6]

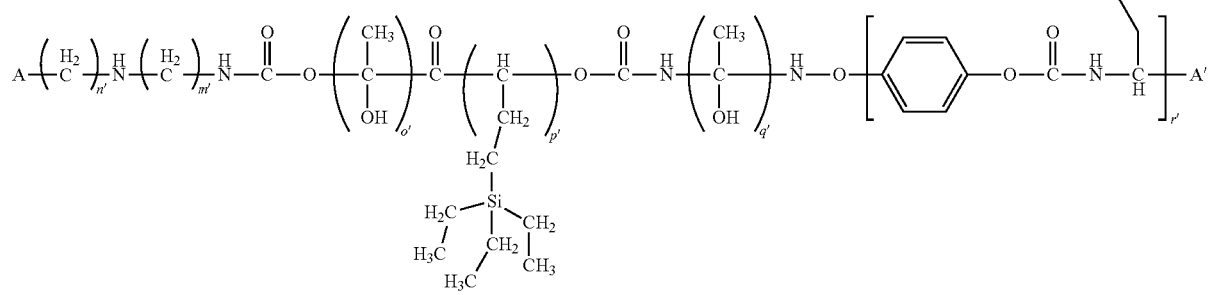

[Formula 7]

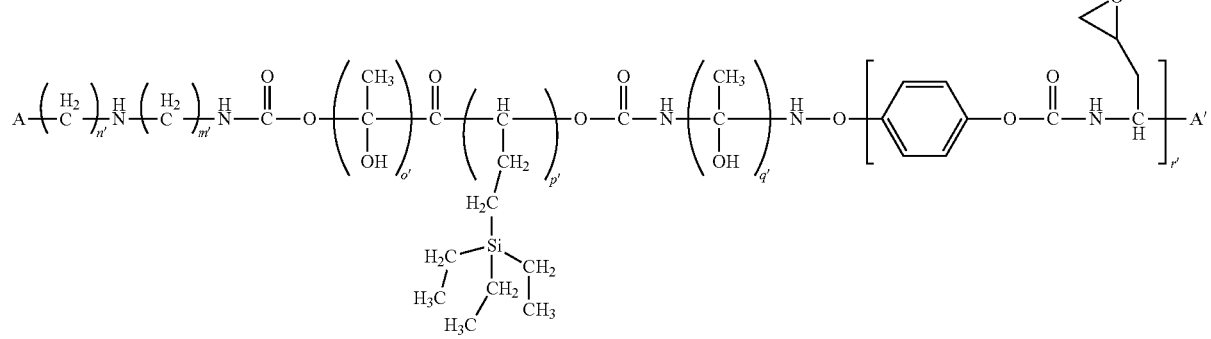

[Formula 2]

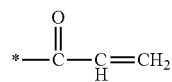

[Formula 5]

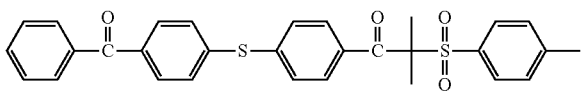

wherein

A and A' are each a substituent represented by Formula 2, and n', m', o', p', q', and r' are the same as or different from each other, and are each independently an integer of 1 to 100.

Test speed: 50 mm/min
Distance between grips: 115 mm
Load cell: 3,000 N
Elasticity range: (0.05~0.25)%
Yield point: 0.2% offset
Test environment: (23±2)° C., (50±5)% R.H.

Figure 1:
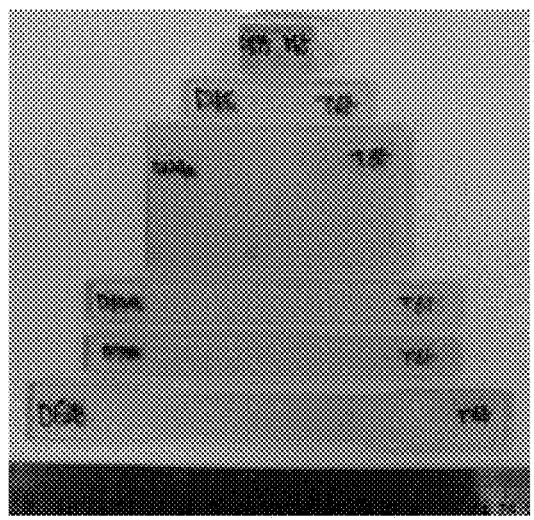
FIG. 1 illustrates a photograph of a 3D printed product using a polymer composition according to an embodiment of the present disclosure.
Figure 2:
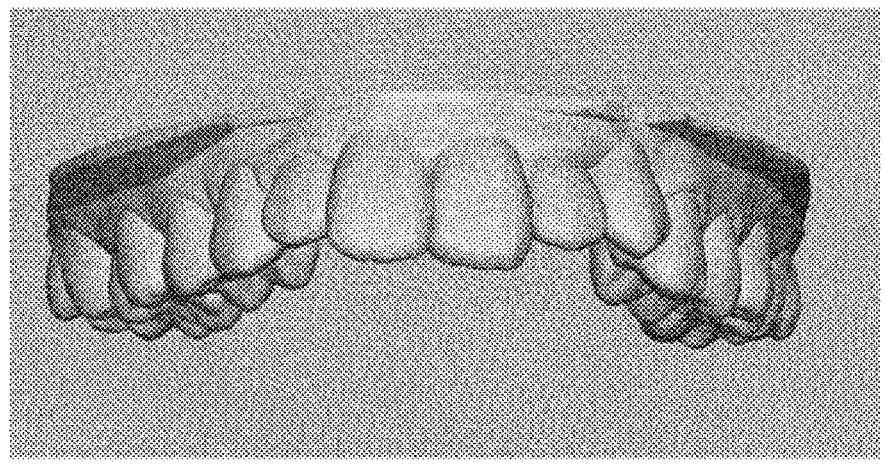
FIG. 2 illustrates a 3D model for producing a transparent orthodontic device according to an embodiment of the present disclosure.
Figure 3:
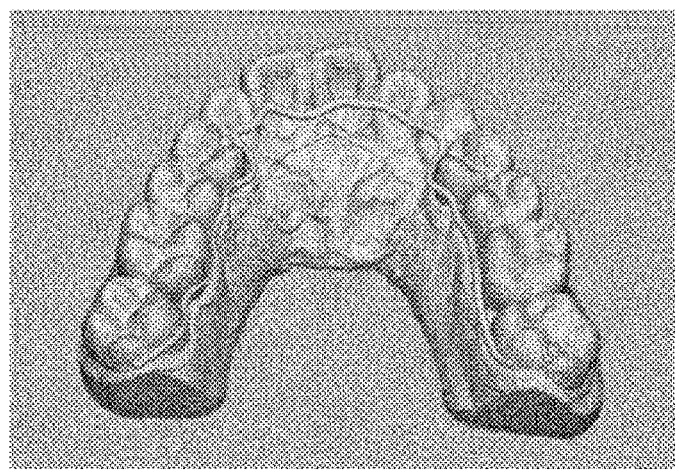
FIG. 3 illustrates a 3D model of a transparent orthodontic device according to an embodiment of the present disclosure, which is a 3D model in which a 3D-printer structure is formed instead of a wire.
Figure 4:
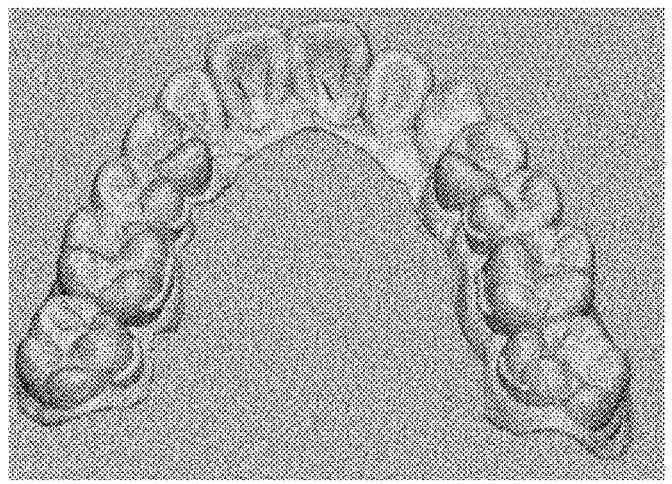
FIG. 4 illustrates a 3D model of a transparent orthodontic device according to an embodiment of the present disclosure, which is a 3D model configured to allow the addition of a connection device such as a wire in a portion.
Figure 5:
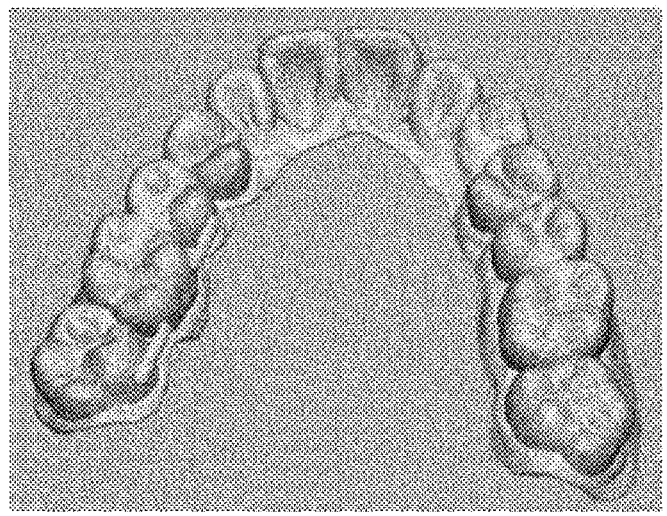
FIG. 5 illustrates a 3D model of a transparent orthodontic device according to an embodiment of the present disclosure, which is a 3D model in which a 3D printer structure capable of serving as a wire is formed in a portion.
Figure 6:
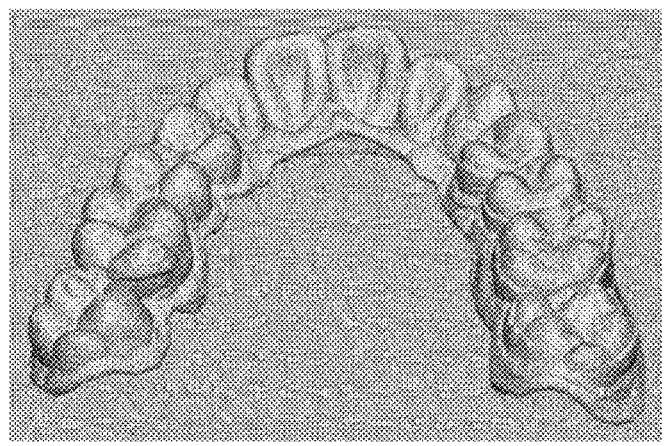
FIG. 6 illustrates a 3D model of a transparent orthodontic device according to an embodiment of the present disclosure, which is a 3D model whose portion is thick.
Figure 7:
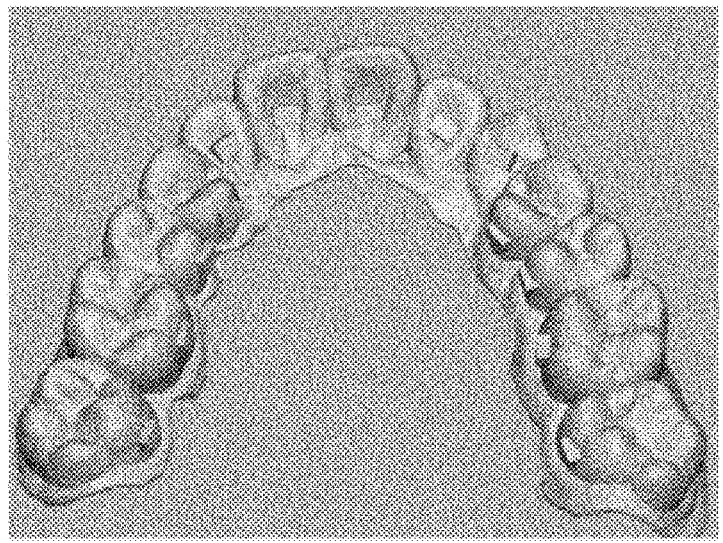
FIG. 7 illustrates a 3D model of a transparent orthodontic device according to an embodiment of the present disclosure, which is a 3D model in which a hole for indirect bonding is formed.
Figure 8:
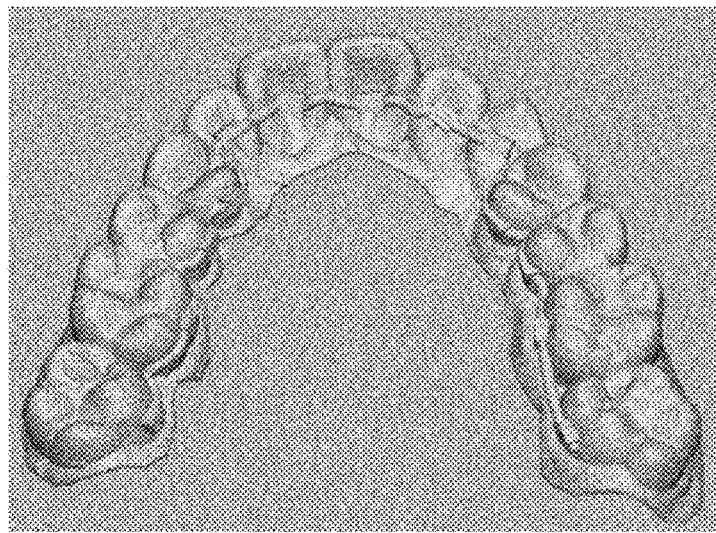
FIG. 8 illustrates a 3D model of a transparent orthodontic device according to an embodiment of the present disclosure, which is a 3D model in which both a wire and indirect bonding are formed.

1-2. Flexural Test
Test method: ASTM D790
Testing instrument: Universal Testing Machine
Test speed: 1.4 mm/min
Distance between spans: 55 mm
Load cell: 200 N
Elasticity section: (0.05~0.25)%
Test environment: (23±2)° C., (50±5)% R.H.
1-3. Heat Deflection Temperature
Test method: ASTM D648
Test load: 0.45 MPa
Heating rate: 2° C./min
2. Test Results The experiment was conducted by the Korea Polymer Testing & Research Institute. The specimens were obtained from the polymer compositions of S10 to S80 in Table 1 above as a specimen of FIG. 1 by printing using a 3D printer.

For S10 to S80, a tensile test and a flexural test were performed, and the results are shown in Tables 2 and 3 below. The heat deflection temperature was measured.

TABLE 2

|  | S10 | S20 | S30 | S40 | S50 | S60 | S70 | S80 |
|---|---|---|---|---|---|---|---|---|
| Maximum load (N) | 1659.23 | 1752.34 | 1955.11 | 2224.92 | 2234.82 | 1827.21 | 2251.64 | 2244.52 |
| Tensile strength (N/m$^2$) | 46.21 | 47.11 | 47.12 | 49.38 | 50.21 | 47.58 | 51.23 | 52.12 |
| Yield strength (N/m$^2$) | 46.15 | 46.78 | 47.11 | 49.38 | 51.21 | 47.21 | 51.64 | 52.12 |
| Elongation (%) | 36.98 | 37.10 | 37.59 | 38.35 | 39.24 | 37.12 | 39.59 | 40.14 |
| Elastic modulus (N/m$^2$) | 1498.23 | 1545.54 | 1588.54 | 1621.31 | 1622.25 | 1521.54 | 1644.25 | 1646.19 |

TABLE 3

|  | S10 | S20 | S30 | S40 | S50 | S60 | S70 | S80 |
|---|---|---|---|---|---|---|---|---|
| Maximum load (N) | 94.1 | 95.4 | 96.1 | 96.3 | 97.1 | 95.2 | 98.4 | 98.6 |
| Flexural strength (N/m$^2$) | 48.4 | 48.9 | 49.2 | 50.3 | 51.2 | 48.1 | 51.8 | 52.1 |
| Strain (%) | 10.12 | 10.98 | 10.95 | 11.04 | 11.05 | 10.85 | 12.01 | 12.12 |
| Flexural modulus (N/m$^2$) | 1201.14 | 1204.12 | 1204.46 | 1205.74 | 1207.45 | 1201.58 | 1211.14 | 1212.44 |

From the tensile test and flexural test results in Tables 2 and 3 above, it was confirmed that the photocurable composition according to the present disclosure exhibited excellent tensile strength, flexural strength, elastic modulus, yield strength, elongation, and strain.

The results of measuring the heat deflection temperature for S10 to S80 are shown in Table 4 below.

TABLE 4

|  | S10 | S20 | S30 | S40 | S50 | S60 | S70 | S80 |
|---|---|---|---|---|---|---|---|---|
| Heat deflection temperature | 32.1 | 52.5 | 57.6 | 60.5 | 62.1 | 92.6 | 56.2 | 57.4 |

(unit: ° C.)

From Table 4 above, it was confirmed that deformation occurred at the hot water temperature (50 to 70° C.) of a water purifier, which is generally and easily accessible, even in the heat deflection temperature range, so that the shape restoration was easy.

Although the preferred embodiments of the present disclosure have been described above in detail, the scope of the present disclosure is not limited thereto. Various modifications and improvements, which are made by those skilled in the art without departing from the basic concept of the present disclosure as defined in the appended claims, also fall within the scope of the present disclosure.

INDUSTRIAL APPLICABILITY

The present disclosure relates to a photocurable composition for 3D printing for producing a transparent orthodontic device, and more particularly, to a photocurable composition for 3D printing capable of producing a transparent orthodontic device that is not visually recognized well from the outside because the transparent orthodontic device is made of a transparent material, and may be easily restored to the original shape thereof and reused even if the state of the orthodontic device changes by use because the orthodontic device is restored to the original shape thereof by heat.

The invention claimed is:
1. A photocurable composition for 3D printing for producing a transparent orthodontic device, the composition comprising: a UV-curable polyurethane oligomer represented by the following Formula 6 or 7;
   a photoinitiator
   a silane coupling agent:
   an oligomer; and
   a stabilizer:

[Formula 6]

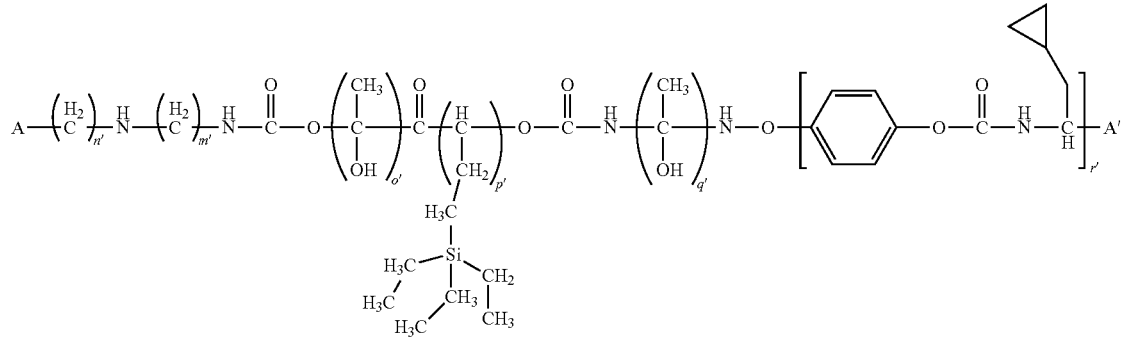

[Formula 7]

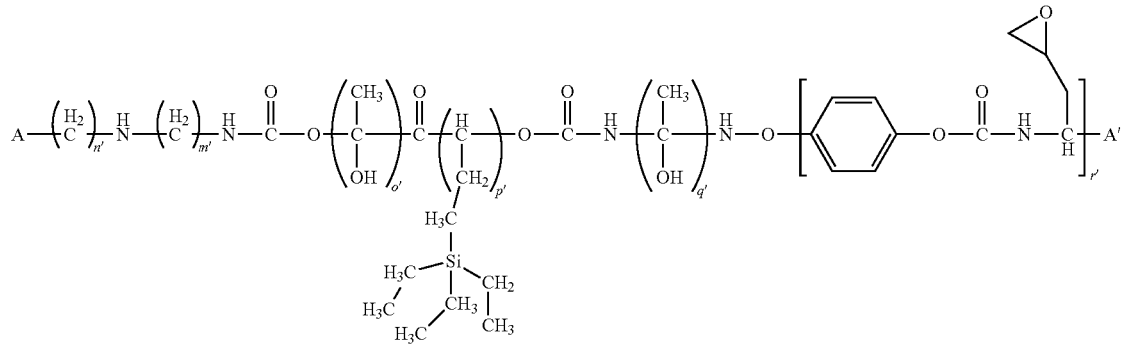

[Formula 2]

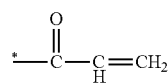

wherein

A and A' are each a substituent represented by Formula 2 above, and n', m', o', p', q', and r' are the same as or different from each other, and are each independently an integer of 1 to 100.

2. The photocurable composition of claim 1, wherein the transparent orthodontic device using the photocurable composition for 3D printing has an elastic modulus of 1,500 to 2,000 N/m$^2$, a tensile strength of 40 to 50 N/m2, and a flexural strength of 45 to 55 N/m$^2$.

3. The photocurable composition of claim 1, wherein the transparent orthodontic device using the photocurable composition for 3D printing is capable of being restored to the original shape thereof in the range of 40 to 80° C.

4. The photocurable composition of claim 1, wherein the UV-curable polyurethane oligomer has a weight average molecular weight of 10,000 to 1,000,000.

5. The photocurable composition of claim 1, wherein the photoinitiator is a compound represented by the following Formula 5:

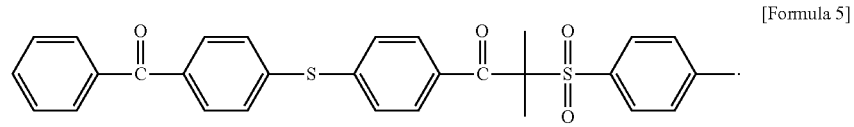

[Formula 5]

6. The photocurable composition of claim 1, wherein the oligomer is selected from the group consisting of an epoxy acrylate oligomer, H$_{12}$ dian-bis-glycidyl ether (4,4'-(1-methylethylidene)biscyclohexanol, polymer with (chloromethyl)oxirane), and a mixture thereof.

7. The photocurable composition of claim 1, wherein the stabilizer is selected from the group consisting of 2,6-di-tert-butyl-p-cresol, diethylethanolamine, trihexylamine, hindered amine, organic phosphate, hindered phenol, and a mixture thereof.

8. A transparent orthodontic device, comprising the photocurable composition for 3D printing of claim 1.

\* \* \* \* \*